(12) United States Patent
Kenney et al.

(10) Patent No.: US 9,369,262 B2
(45) Date of Patent: Jun. 14, 2016

(54) FULL-DUPLEX COORDINATION SYSTEM

(71) Applicant: Toyota InfoTechnology Center USA, Inc., Mountain View, CA (US)

(72) Inventors: John Kenney, Santa Clara, CA (US); Gaurav Bansal, San Jose, CA (US)

( * ) Notice: Subject to any disclaimer, the term of this patent is extended or adjusted under 35 U.S.C. 154(b) by 49 days.

(21) Appl. No.: 14/471,387

(22) Filed: Aug. 28, 2014

(65) Prior Publication Data
US 2016/0065355 A1    Mar. 3, 2016

(51) Int. Cl.
*H04B 7/005* (2006.01)
*H04L 5/16* (2006.01)

(52) U.S. Cl.
CPC ........................................ *H04L 5/16* (2013.01)

(58) Field of Classification Search
None
See application file for complete search history.

(56) References Cited

U.S. PATENT DOCUMENTS

| 2013/0229952 A1* | 9/2013 | Koskinen | H04L 5/16 370/278 |
| 2015/0029905 A1* | 1/2015 | Yi | H04L 1/0026 370/277 |
| 2015/0195079 A1* | 7/2015 | Gong | H04L 5/1415 370/277 |

* cited by examiner

*Primary Examiner* — Duc C Ho
(74) *Attorney, Agent, or Firm* — Burbage Law, P.C.; Jon Burbage

(57) ABSTRACT

The disclosure includes a system and method for implementing full-duplex wireless communications between communication devices. The system includes a processor and a memory storing instructions that, when executed, cause the system to: create, at a first communication device, first data to transmit to a second communication device; switch a half-duplex operation mode of the first communication device to a full-duplex operation mode to activate the full-duplex operation mode of the first communication device; transmit a first portion of the first data from the first communication device to the second communication device using a wireless channel; and transmit, in the full-duplex operation mode of the first communication device, a remaining portion of the first data to the second communication device while simultaneously receiving second data from the second communication device using the wireless channel.

40 Claims, 9 Drawing Sheets

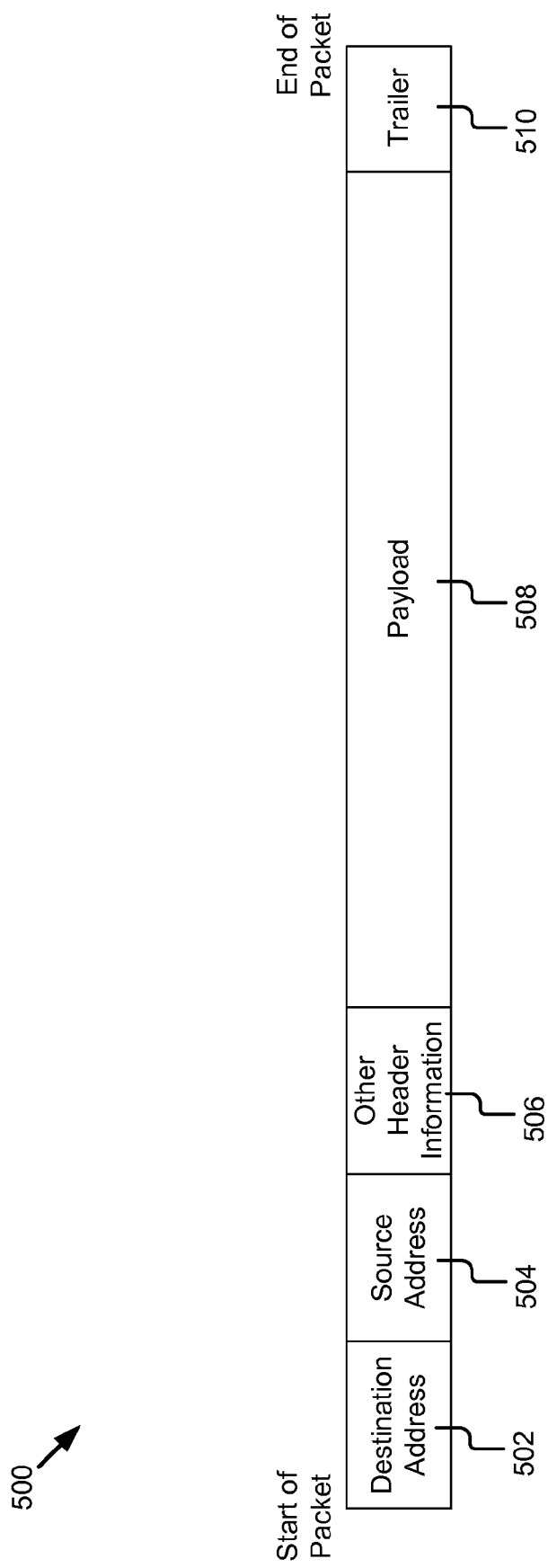

FULL-DUPLEX COORDINATION SYSTEM

BACKGROUND

This disclosure relates to wireless communications between communication devices. In particular, this disclosure relates to implementing full-duplex wireless communications between communication devices.

In a half-duplex communication system, a first communication device currently transmitting data to a second communication device is not capable of simultaneously receiving data from the second communication device. If the second communication device has data to transmit to the first communication device, the second communication device needs to wait until the first communication device completes its data transmission. Only one communication device is allowed to transmit data at one time in the half-duplex communication system.

In a standard IEEE 802.11 Wireless Local Area Network (WLAN), communication devices may compete for access to a wireless channel based on the Carrier Sense Multiple Access with Collision Avoidance (CSMA/CA) Medium Access Control (MAC) protocol. The IEEE 802.11 MAC protocol requires that only one communication device may use the wireless channel to transmit data at one time. If two or more communication devices transmit data over the wireless channel at the same time, a collision occurs. As a result, only the communication device that currently gains access to the wireless channel may use the wireless channel to transmit data. Other communication devices having data to transmit need to monitor the wireless channel and may compete for access to the wireless channel when the wireless channel becomes idle again.

SUMMARY

According to one innovative aspect of the subject matter described in this disclosure, a system for implementing full-duplex wireless communications includes a processor and a memory storing instructions that, when executed, cause the system to: create, at a first communication device, first data to transmit to a second communication device; switch a half-duplex operation mode of the first communication device to a full-duplex operation mode to activate the full-duplex operation mode of the first communication device; transmit a first portion of the first data from the first communication device to the second communication device using a wireless channel; and transmit, in the full-duplex operation mode of the first communication device, a remaining portion of the first data to the second communication device while simultaneously receiving second data from the second communication device using the wireless channel.

According to another innovative aspect of the subject matter described in this disclosure, a system for implementing full-duplex wireless communications includes a processor and a memory storing instructions that, when executed, cause the system to: receive a first portion of first data from a first communication device via a wireless channel; determine that a second communication device is a single destination of the first data based on the first portion of the first data; determine that the second communication device has second data to transmit to the first communication device; determine that the first communication device has full-duplex communication capability; switch a half-duplex operation mode of the second communication device to a full-duplex operation mode to activate the full-duplex operation mode of the second communication device; and transmit, in the full-duplex operation mode of the second communication device, the second data to the first communication device while simultaneously receiving a remaining portion of the first data from the first communication device using the wireless channel.

In general, another innovative aspect of the subject matter described in this disclosure may be embodied in methods that include: creating, at a first communication device, first data to transmit to a second communication device; switching a half-duplex operation mode of the first communication device to a full-duplex operation mode to activate the full-duplex operation mode of the first communication device; transmitting a first portion of the first data from the first communication device to the second communication device using a wireless channel; and transmitting, in the full-duplex operation mode of the first communication device, a remaining portion of the first data to the second communication device while simultaneously receiving second data from the second communication device using the wireless channel.

Yet another innovative aspect of the subject matter described in this disclosure may be embodied in methods that include: receiving a first portion of first data from a first communication device via a wireless channel; determining that a second communication device is a single destination of the first data based on the first portion of the first data; determining that the second communication device has second data to transmit to the first communication device; determining that the first communication device has full-duplex communication capability; switching a half-duplex operation mode of the second communication device to a full-duplex operation mode to activate the full-duplex operation mode of the second communication device; and transmitting, in the full-duplex operation mode of the second communication device, the second data to the first communication device while simultaneously receiving a remaining portion of the first data from the first communication device using the wireless channel.

Another innovative aspect of the subject matter described in this disclosure may be embodied in methods that include: determining first data to transmit from a first communication device to a second communication device; and transmitting, from the first communication device that operates in a full-duplex operation mode, the first data to the second communication device while simultaneously receiving second data from the second communication device using a common wireless channel.

Another innovative aspect of the subject matter described in this disclosure may be embodied in methods that include: receiving, from a first communication device, first data at a second communication device via a wireless channel; determining second data to transmit from the second communication device to the first communication device responsive to receiving at least a portion of the first data; and transmitting, from the second communication device that operates in a full-duplex operation mode, the second data to the first communication device using the wireless channel while simultaneously receiving the first data from the first communication device.

Another innovative aspect of the subject matter described in this disclosure may be embodied in methods that include: determining, at a first communication device, first data to transmit to a second communication device; switching the first communication device from a half-duplex operation mode to a full-duplex operation mode; transmitting, in the full-duplex operation mode of the first communication device, the first data to the second communication device while simultaneously receiving second data from the second communication device using the wireless channel; and switching the full-duplex operation mode of the first communication device to the half-duplex operation mode responsive to a determination that transmission of the first data completes.

Another innovative aspect of the subject matter described in this disclosure may be embodied in methods that include: receiving, from a first communication device, first data at a second communication device via a wireless channel; determining that the second communication device has second data to transmit to the first communication device; switching the second communication device from a half-duplex operation mode to a full-duplex operation mode; transmitting, in the full-duplex operation mode of the second communication device, the second data to the first communication device while simultaneously receiving the first data from the first communication device using the wireless channel; and switching the full-duplex operation mode of the second communication device to the half-duplex operation mode responsive to a determination that transmission of the second data completes.

Other aspects include corresponding methods, systems, apparatus, and computer program products for these and other innovative aspects.

These and other implementations may each optionally include one or more of the following operations and features. For instance, the features include: the first data including a first packet and the first portion of the first data including a header portion of the first packet; the remaining portion of the first data including a payload portion and a trailer portion of the first packet; determining that the second communication device is a single destination of the first data; activating the full-duplex operation mode of the first communication device responsive to the second communication device being the single destination of the first data; the first communication device and the second communication device being communication devices in a wireless local area network; determining that the first communication device operates in a regulated spectrum where full-duplex communication capability is required; receiving device registry data associated with the first communication device; determining that the first communication device has full-duplex communication capability based on the device registry data; and determining that the first communication device has full-duplex communication capability based on a capability indication field in the first portion of the first data, the capability indication field including data describing whether the first communication device has full-duplex communication capability.

For instance, the operations include: determining that the wireless channel is idle; and accessing the wireless channel for data communication between the first communication device and the second communication device based on a channel access rule.

The disclosure is particularly advantageous in a number of respects. For example, the system described herein is capable of achieving a higher throughput and a faster communication speed using full-duplex communication technologies rather than using half-duplex communication technologies. The full-duplex communication may be implemented between vehicles (e.g., communication systems installed in vehicles) or other communication devices that have full-duplex communication capability. In another example, the system coordinates communication between communication devices in a distributed way without using a central coordinator. The system determines a pair of communication devices and coordinates simultaneous transmission of data between the pair of communication devices so that the pair of communication devices may transmit data to each other simultaneously using the same wireless channel. Meanwhile, other communication devices may not transmit data over the wireless channel to avoid collision. The advantages of the system described herein are provided by way of example, and the system may have numerous other advantages.

BRIEF DESCRIPTION OF THE DRAWINGS

The disclosure is illustrated by way of example, and not by way of limitation in the figures of the accompanying drawings in which like reference numerals are used to refer to similar elements.

FIG. 5 is a graphic representation illustrating an example packet.

DETAILED DESCRIPTION

System Overview

Figure 1:
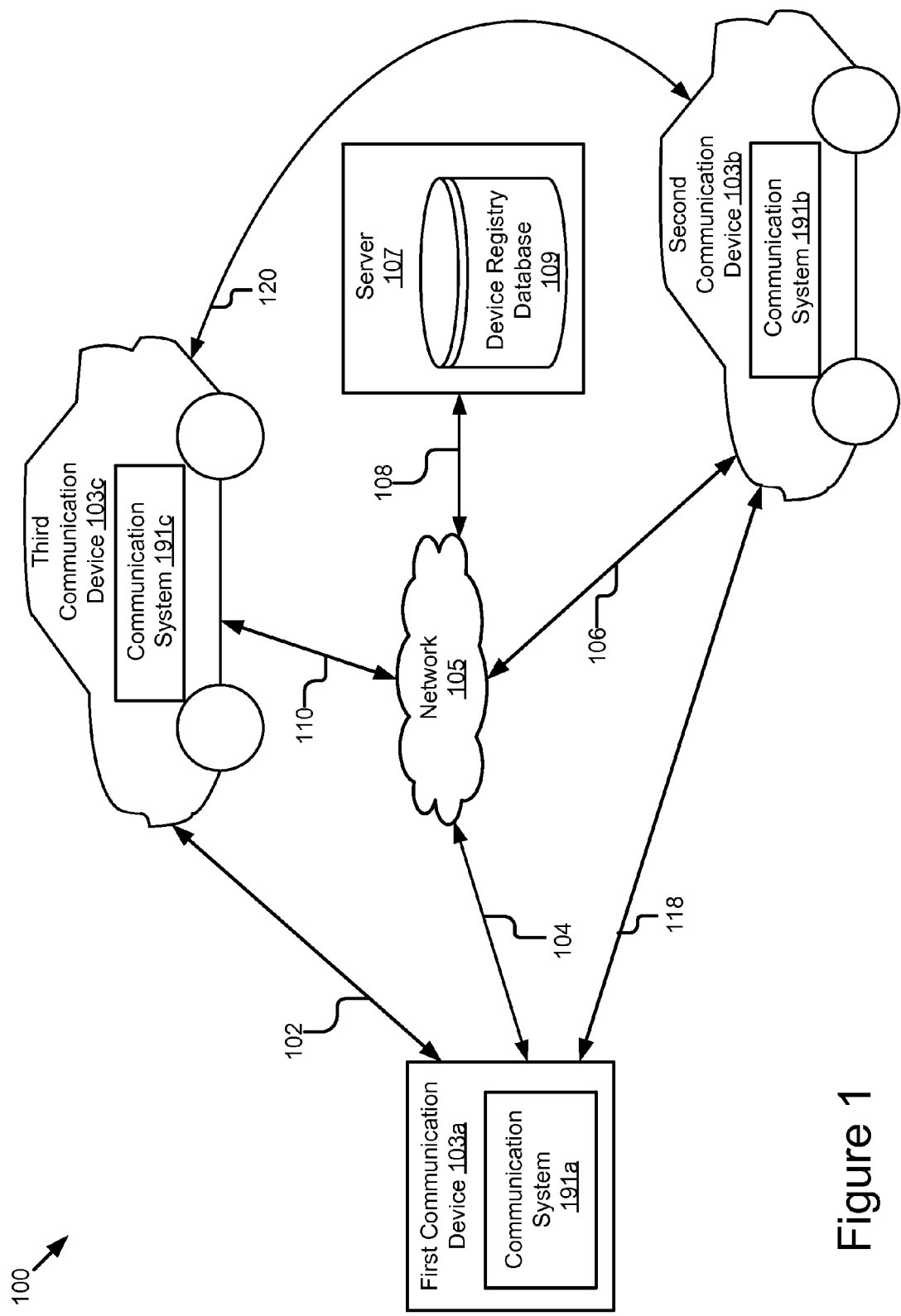
FIG. 1 is a block diagram illustrating an example system for implementing full-duplex wireless communications between communication devices.

FIG. 1 illustrates a block diagram of some implementations of a system 100 for implementing full-duplex wireless communications between communication devices. The system 100 includes a server 107, a first communication device 103a, a second communication device 103b, and a third communication device 103c (also referred to herein individually and collectively as communication device 103). The system 100 may include other servers or devices not shown in FIG. 1 including, for example, a traffic server for providing traffic data, a weather server for providing weather data, and a map server for providing map data, etc.

In some implementations, these entities of the system 100 may be communicatively coupled via a network 105. The first communication device 103a may be communicatively coupled to the network 105 via a signal line 104. The second communication device 103b may be communicatively coupled to the network 105 via a signal line 106. The third communication device 103c may be communicatively coupled to the network 105 via a signal line 110. The server 107 may be communicatively coupled to the network 105 via a signal line 108. Each of the signal lines 104, 106, 108, and 110 may represent a wired connection or a wireless connection (e.g., wireless fidelity (Wi-Fi), Bluetooth®, etc.).

In some implementations, the communication devices 103a, 103b, and 103c may communicate with each other directly. The first communication device 103a may be communicatively coupled to the second communication device 103b via a signal line 118. The first communication device 103a may be communicatively coupled to the third communication device 103c via a signal line 102. The third communication device 103c may be communicatively coupled to the second communication device 103b via a signal line 120. Each of the signal lines 102, 118, and 120 may represent a wired connection or a wireless connection. While the communication devices 103a, 103b, and 103c may be coupled to the network 105 via signal lines 118, 106, and 110 respectively for communication with the server 107, the communication devices 103a, 103b, and 103c may communicate with each other directly using wireless connections without accessing the network 105 (e.g., illustrated as signal lines 102, 118, and 120 in FIG. 1).

The communication devices 103a, 103b, and 103c in FIG. 1 are used by way of example. While FIG. 1 illustrates one server 107 and three communication devices 103a, 103b, 103c, the present disclosure applies to a system architecture having one or more servers 107 and one or more communication devices 103. Furthermore, although FIG. 1 illustrates one network 105 coupled to the communication devices 103 and the server 107, in practice one or more networks 105 can be connected to these entities.

The network 105 can be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices may communicate. In some implementations, the network 105 may be a peer-to-peer network. The network 105 may also be coupled to or may include portions of a telecommunications network for sending data in a variety of different communication protocols. In some implementations, the network 105 includes Bluetooth® communication networks or a cellular communications network for sending and receiving data including via short messaging service (SMS), multimedia messaging service (MMS), hypertext transfer protocol (HTTP), direct data connection, WAP, e-mail, etc.

The first communication device 103a may be a computing device that includes a memory and a processor, for example, a server, a laptop computer, a desktop computer, a tablet computer, a mobile telephone, a personal digital assistant ("PDA"), a mobile e-mail device, a portable game player, a portable music player, a television with one or more processors embedded therein or coupled thereto, or other electronic device capable of accessing the network 105. A user may interact with the first communication device 103a. As illustrated in FIG. 1, the first communication device 103a includes a communication system 191a.

The second communication device 103b may be a mobile communication node. For example, the second communication device 103b may include an onboard communication device included in one of a vehicle (e.g., an automobile, a bus, an airplane), a bionic implant, or any other mobile system. In some implementations, the second communication device 103b may include a computing device that includes a memory and a processor. A user may interact with the second communication device 103b. As illustrated in FIG. 1, the second communication device 103b includes a communication system 191b.

In some implementations, the second communication device 103b may include one or more sensors (not shown), such as a navigation sensor (e.g., a global positioning system (GPS) sensor), an infrared detector, a motion detector, a thermostat, a sound detector, and any other type of sensors. For example, the second communication device 103b may include sensors for measuring one or more of a current time, a location (e.g., a latitude, longitude, and altitude of a location), an acceleration of a vehicle, a velocity of a vehicle, a fuel tank level, and a battery level of a vehicle, etc.

As illustrated in FIG. 1, the third communication device 103c includes a communication system 191c. In some implementations, the first, second, and third communication devices 103a, 103b, and 103c may be the same type of devices. For example, the first, second, and third communication devices 103a, 103b, and 103c may be onboard communication devices installed in vehicles. In some other implementations, the first, second, and third communication devices 103a, 103b, and 103c may be different types of devices. For example, the second communication device 103b may be a device installed in a vehicle while the first and third communication devices 103a and 103c may be a server including a processor and a memory.

The communication systems 191a, 191b, 191c (also referred to herein individually and collectively as communication system 191) can be a system for implementing wireless communications between communication devices 103. In some implementations, the communication system 191 can be implemented using hardware including a field-programmable gate array ("FPGA") or an application-specific integrated circuit ("ASIC"). In some other implementations, the communication system 191 can be implemented using a combination of hardware and software. The communication system 191 may be stored in a combination of the devices (e.g., servers or other devices), or in one of the devices. The communication system 191 is described in more detail below with reference to FIGS. 2-4.

The server 107 can be a hardware server that includes a processor, a memory, and network communication capabilities. The server 107 may send and receive data to and from other entities of the system 100 via the network 105. The server 107 includes a device registry database 109. The server 107 may also include other storage devices for storing other data.

The device registry database 109 can be a non-transitory storage medium that stores data for providing the functionality described herein. The device registry database 109 may be a dynamic random access memory (DRAM) device, a static random access memory (SRAM) device, flash memory, or some other memory devices. In some implementations, the device registry database 109 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some implementations, the device registry database 109 stores data describing one or more device registry entries related to one or more communication devices 103 registered in the server 107. A device registry entry may include an identifier (ID) of an associated communication device 103 and data indicating whether the associated communication device 103 has full-duplex communication capability. In some implementations, a device registry entry may include data describing a location and a communication environment (e.g., noise, multipath fading, shadow fading, etc.) associated with a communication device 103. In some implementations, the device registry database 109 may store other data for providing the functionality described herein.

In FIG. 1, the communication devices 103a, 103b, and 103c may access the device registry database 109 via the network 105. However, in some implementations the device registry database 109 may be implemented in a distributed approach. For example, each communication devices 103a, 103b, and 103c may be connected to a separate local device registry database rather than a central device registry database on the cloud.

The communication devices 103a, 103b, and 103c described herein may share a common wireless channel for data communication. For example, the communication devices 103a, 103b, and 103c may be in the same wireless local area network and may take turns to access a radio frequency channel for transmitting data via the radio frequency channel. The communication devices 103a, 103b, and 103c may compete for access to the shared wireless channel based on one or more channel access rules. For example, in an IEEE 802.11 WLAN, the communication devices 103a, 103b, and 103c may compete for access to the common wireless channel using the CSMA/CA MAC protocol.

Assume that the first communication device 103a gains access to the common wireless channel and has unicast packets to transmit to the second communication device 103b. The first communication device 103a may use the wireless channel to continuously transmit the unicast packets to the second communication device 103b until all the available packets addressed to the second communication device 103b have been transmitted. During the transmission of the packets from the first communication device 103a to the second communication device 103b, the second communication device 103b may also use the wireless channel to transmit unicast packets to the first communication device 103a at the same time if full-duplex communication capability is enabled. Other communication devices 103 may listen to the wireless channel and will not transmit packets over the wireless channel to avoid collision. Upon completion of the packet transmission, the first communication device 103a may release the wireless channel so that the other communication devices 103 may compete for access to the wireless channel again.

If the first communication device 103a uses the wireless channel to transmit broadcast packets to multiple destinations, none of the other communication devices 103 may transmit packets over the wireless channel at the same time to avoid collision. During the broadcast packet transmission from the first communication device 103a to multiple destinations, other communication devices 103 may listen to the wireless channel. Upon completion of the packet transmission, the first communication device 103a may release the wireless channel so that other communication devices 103 may compete for access to the wireless channel again.

Throughout the disclosure, the term "full-duplex communication" may describe that a pair of communication devices 103 with full-duplex communication capability may transmit data or signals to each other simultaneously using a common wireless channel. For example, a first communication device 103 and a second communication device 103 with full-duplex communication capability may transmit signals to each other using a common radio frequency channel at the same time. The first communication device 103 is capable of decoding signals from the second communication device 103, and vice versa.

For example, during the full-duplex communication, the first communication device 103 transmits a first signal to the second communication device 103. Simultaneously, the second communication device 103 transmits a second signal to the first communication device 103. As a result, the first communication device 103 and the second communication device 103 may receive a total signal that includes a sum of the first signal and the second signal, respectively. Since the first communication device 103 knows the first signal transmitted by itself, the first communication device 103 is capable of determining the second signal from the second communication device 103 by subtracting the first signal from the total signal (e.g., the second signal≈the total signal−the first signal). Similarly, the second communication device 103 is able to decode the first signal from the first communication device 103 by subtracting the second signal from the total signal.

However, other communication devices 103 that do not know the first signal and the second signal are not able to decode the first signal or the second signal from the total signal. Also, other communication devices 103 cannot transmit data over the wireless channel when the first communication device 103 and the second communication device 103 are transmitting data to each other.

Example Communication System

Figure 2:
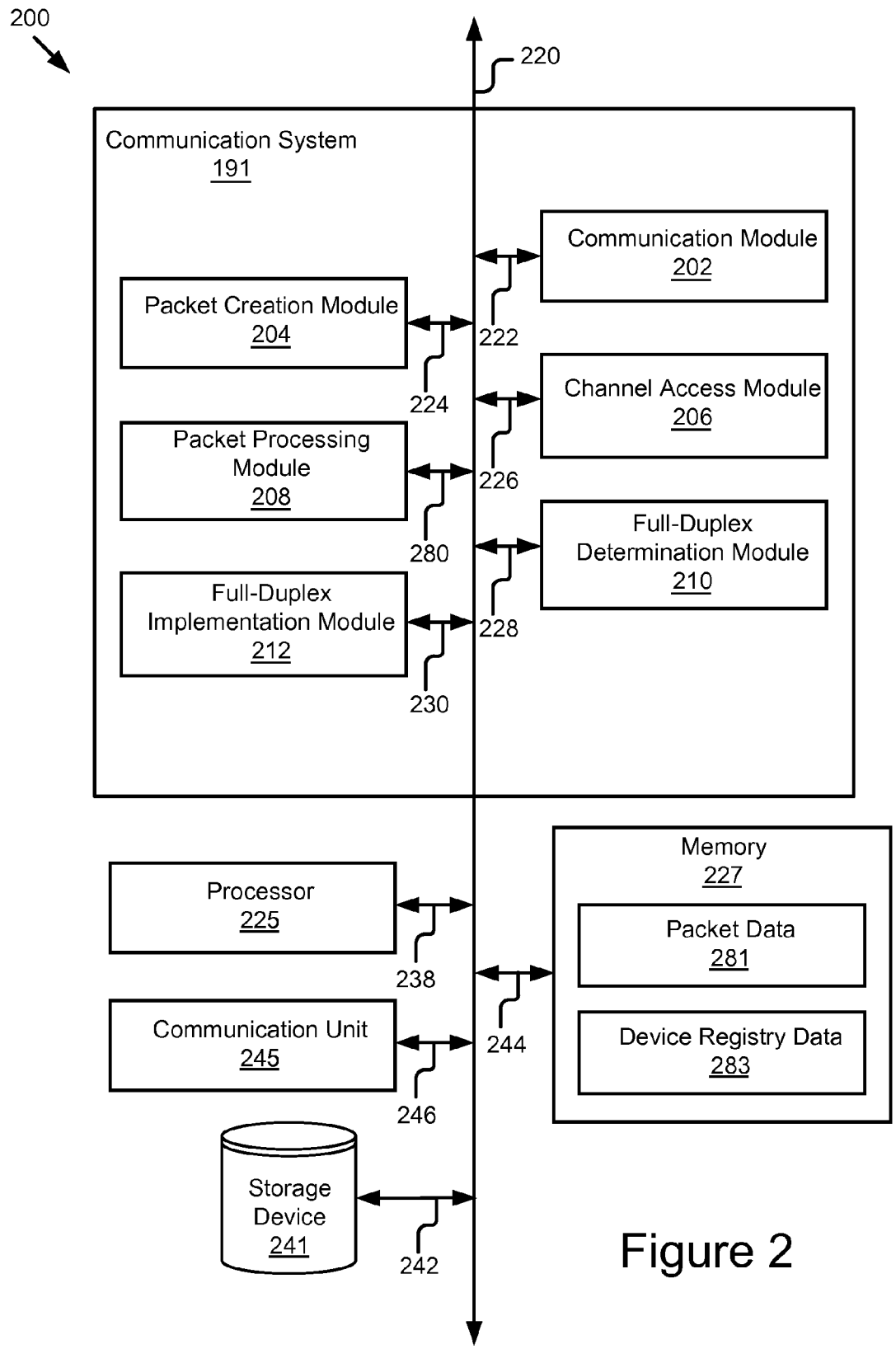
FIG. 2 is a block diagram illustrating an example computing device that includes an example communication system.

Referring now to FIG. 2, an example of the communication system 191 is shown in more detail. FIG. 2 is a block diagram of a computing device 200 that includes the communication system 191, a processor 225, a communication unit 245, a storage device 241, and a memory 227 according to some examples. The components of the computing device 200 are communicatively coupled by a bus 220. The implementation of the bus 220 in FIG. 2 is illustrated by way of example and not intended to limit the implementation of the computing device 200. For example, the components of the computing device 200 may be coupled using other mechanisms such as internal connectivity. In some implementations, the computing device 200 can be one of the first communication device 103a, the second communication device 103b, the third communication device 103c, and another server or device that may include the communication system 191.

The processor 225 includes an arithmetic logic unit, a microprocessor, a general-purpose controller, or some other processor array to perform computations. In some implementations, the processor 225 may provide electronic display signals to a display device. The processor 225 is coupled to the bus 220 for communication with the other components via a signal line 238. The processor 225 processes data signals and may include various computing architectures including a complex instruction set computer (CISC) architecture, a reduced instruction set computer (RISC) architecture, or an architecture implementing a combination of instruction sets. Although FIG. 2 includes a single processor 225, multiple processors 225 may be included. Other processors, operating systems, sensors, displays, and physical configurations may be possible.

The memory 227 stores instructions or data that may be executed by the processor 225. The memory 227 is coupled to the bus 220 for communication with the other components via a signal line 244. The instructions or data may include code for performing the techniques described herein. The memory 227 may be a dynamic random access memory (DRAM) device, a static random access memory (SRAM) device, flash memory, or some other memory device. In some implementations, the memory 227 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

As illustrated in FIG. 2, the memory 227 stores packet data 281 and device registry data 283. In some implementations, the packet data 281 may include data describing one or more packets from other communication devices 103. The packet data 281 may also include data describing one or more packets to transmit to other communication devices 103. The device registry data 283 may include a device registry entry associated with the computing device 200 that indicates whether the computing device 200 has full-duplex communication capability. The device registry data 283 also includes other device registry entries indicating whether other communication devices 103 that communicate with the computing device 200 have full-duplex communication capability.

The communication unit 245 transmits and receives data to and from at least one of the server 107 and other communication devices 103. The communication unit 245 is coupled to the bus 220 via a signal line 246. In some implementations, the communication unit 245 includes a port for direct physical connection to the network 105 or to another communication channel. For example, the communication unit 245 includes a USB, SD, CAT-5, or similar port for wired communication with the network 105. In some implementations, the communication unit 245 includes a wireless transceiver for exchanging data with the communication devices 103 or other communication channels using one or more wireless communication methods, including IEEE 802.11, IEEE 802.16, Bluetooth®, or another suitable wireless communication method.

In some implementations, the communication unit 245 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some implementations, the communication unit 245 includes a wired port and a wireless transceiver. The communication unit 245 also provides other conventional connections to the network 105 for distribution of files or media objects using standard network protocols including TCP/IP, HTTP, HTTPS, and SMTP, etc.

The storage device 241 can be a non-transitory storage medium that stores data for providing the functionality described herein. The storage device 241 may be a dynamic random access memory (DRAM) device, a static random access memory (SRAM) device, flash memory, or some other memory devices. In some implementations, the storage device 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The storage device 241 is communicatively coupled to the bus 220 via a signal line 242. In some implementations, the storage device 241 may store data that was temporarily stored in the memory 227.

In the illustrated implementation shown in FIG. 2, the communication system 191 includes a communication module 202, a packet creation module 204, a channel access module 206, a packet processing module 208, a full-duplex determination module 210, and a full-duplex implementation module 212. These components of the communication system 191 are communicatively coupled to each other via the bus 220.

In some implementations, modules of the communication system 191 can be stored in a single server or device. In some other implementations, modules of the communication system 191 can be distributed and stored across multiple servers or devices. Furthermore, the separation of various components, modules, and servers in the implementations described herein should not be understood as requiring such separation in all implementations. In some implementations, the described components, modules, devices, or servers can generally be integrated together in a single component, module, device, or server.

The communication module 202 can be software including routines for handling communications between the communication system 191 and other components of the computing device 200. In some implementations, the communication module 202 can be a set of instructions executable by the processor 225 to provide the functionality described below for handling communications between the communication system 191 and other components of the computing device 200. In some implementations, the communication module 202 can be stored in the memory 227 of the computing device 200 and can be accessible and executable by the processor 225. The communication module 202 may be adapted for cooperation and communication with the processor 225 and other components of the computing device 200 via a signal line 222.

The communication module 202 sends and receives data, via the communication unit 245, to and from one or more of the server 107 and other communication devices 103. For example, the communication module 202 receives, via the communication unit 245, device registry data from the server 107 and sends the device registry data to the full-duplex determination module 210. In another example, the communication module 202 receives packet data from the full-duplex implementation module 212 and sends the packet data from the computing device 200 to another communication device 103 via the communication unit 245.

In some implementations, the communication module 202 receives data from components of the communication system 191 and stores the data in one or more of the storage device 241 and the memory 227. In some implementations, the communication module 202 retrieves data from the storage device 241 or the memory 227 and sends the data to one or more components of the communication system 191. In some implementations, the communication module 202 may handle communications between components of the communication system 191. For example, the communication module 202 receives data describing a created packet from the packet creation module 204 and sends the data to the full-duplex implementation module 212.

The packet creation module 204 can be software including routines for creating packets to transmit from the computing device 200 to other communication devices 103. In some implementations, the packet creation module 204 can be a set of instructions executable by the processor 225 to provide the functionality described below for creating packets to transmit from the computing device 200 to other communication devices 103. In some implementations, the packet creation module 204 can be stored in the memory 227 of the computing device 200 and can be accessible and executable by the processor 225. The packet creation module 204 may be adapted for cooperation and communication with the processor 225 and other components of the computing device 200 via a signal line 224.

In some implementations, the packet creation module 204 creates data to transmit from the computing device 200 to another communication device 103. The other communication device 103 may be at a different location from the computing device 200 or at the same location as the computing device 200. The created data may include one or more packets to be sent to the other communication device 103. A packet includes a header portion, a payload portion, and a trailer portion. The packet may start from the header portion, followed by the payload portion and ended with the trailer portion. A packet length may include a total length of the header portion, the payload portion, and the trailer portion. In some implementations, a length of the header portion is smaller than a length of the payload portion. The payload portion includes the actual data to transmit to the other communication device 103. The trailer portion includes protocol information that follows the payload portion. An example packet is illustrated in FIG. 5.

The header portion includes a destination address, a source address, and other header information (e.g., an ID of the computing device 200 that creates the packet, a packet length, and other protocol information). For example, a header portion of a packet sent from the computing device 200 to the other communication device 103 may include a destination address as an address of the other communication device 103, a source address as an address of the computing device 200, and a packet length. In some implementations, a packet is a unicast packet, and the destination address in the packet includes a unique address corresponding to a single destination (e.g., a particular communication device 103). In some other implementations, a packet is a broadcast packet, and the destination address in the packet includes a broadcast address so that the packet is sent to multiple communication devices 103 associated with the broadcast address.

In some implementations, the header portion may additionally include data indicating whether the computing device 200 has full-duplex communication capability. For example, the computing device 200 and the other communication device 103 may use Wave Short Message Protocol (WSMP) at the network layer, and the header portion may include a capability indication field as part of a WSMP header standardized in IEEE 1609.3 Networking Services. A capability indication field in a header portion of a packet indicates whether a communication device 103 that creates the packet has full-duplex communication capability.

In some implementations, the packet creation module 204 sends the one or more packets to the full-duplex implementation module 212 so that the full-duplex implementation module 212 may transmit the one or more packets to the other communication device 103 in a full-duplex operation mode. The full-duplex operation mode indicates that the computing device 200 and the other communication device 103 may transmit data to each other simultaneously using the same wireless channel. In some other implementations, the packet creation module 204 may temporarily store the one or more packets in the memory 227 or the storage device 241 so that the full-duplex implementation module 212 may retrieve the one or more packets from the memory 227 or the storage device 241. The full-duplex implementation module 212 may transmit the one or more packets to the other communication device 103 in a full-duplex operation mode.

The channel access module 206 can be software including routines for accessing a wireless channel. In some implementations, the channel access module 206 can be a set of instructions executable by the processor 225 to provide the functionality described below for accessing a wireless channel. In some implementations, the channel access module 206 can be stored in the memory 227 of the computing device 200 and can be accessible and executable by the processor 225. The channel access module 206 may be adapted for cooperation and communication with the processor 225 and other components of the computing device 200 via a signal line 226.

The computing device 200 may share a common wireless channel with other communication devices 103 for data communication. The computing device 200 and the other communication devices 103 may compete for access to the shared wireless channel based on one or more channel access rules. For example, the channel access module 206 on the computing device 200 senses that the wireless channel is idle and gains access to the wireless channel for the computing device 200 based on one or more channel access rules. Example channel access rules include, but are not limited to, Carrier Sense Multiple Access with Collision Detection (CSMA/CD) and CSMA/CA. After gaining access to the wireless channel, the computing device 200 may start transmitting data using the wireless channel.

If the channel access module 206 on the computing device 200 senses that the wireless channel is busy (e.g., another communication device 103 currently using the wireless channel to transmit data), the channel access module 206 may continue monitoring the wireless channel. The channel access module 206 on the computing device 200 may compete for access to the wireless channel when the wireless channel becomes idle again.

The packet processing module 208 can be software including routines for processing packets received from other communication devices 103. In some implementations, the packet processing module 208 can be a set of instructions executable by the processor 225 to provide the functionality described below for processing packets received from other communication devices 103. In some implementations, the packet processing module 208 can be stored in the memory 227 of the computing device 200 and can be accessible and executable by the processor 225. The packet processing module 208 may be adapted for cooperation and communication with the processor 225 and other components of the computing device 200 via a signal line 280.

In some implementations, another communication device 103 may initiate data transmission to the computing device 200. For example, after gaining access to the shared wireless channel based on the CSMA/CA MAC protocol, the other communication device 103 may start transmitting packets to the computing device 200. As the packet processing module 208 stored in the computing device 200 receives a first portion of a first packet from the other communication device 103, the packet processing module 208 may determine whether the computing device 200 is the sole destination of the first packet. The packet processing module 208 does not need to receive the entire first packet to determine whether the computing device 200 is the sole destination of the first packet. For example, the packet processing module 208 may determine that the computing device 200 is the single destination of the first packet upon receiving a header portion of the first packet from the other communication device 103, since the header portion includes an address of the computing device 200 as the destination address.

If the computing device 200 is the sole destination of the first packet from the other communication device 103, the packet processing module 208 may generate a destination-confirmation signal and may send the destination-confirmation signal to the full-duplex determination module 210. The destination-confirmation signal indicates the computing device 200 is the sole destination of the first packet from the other communication device 103.

However, if the computing device 200 is not a destination of the first packet, the packet processing module 208 discards all the packets from the other communication device 103. If the computing device 200 is not the only destination of the first packet (e.g., the first packet being a broadcast packet addressed to multiple different destinations including the computing device 200), the packet processing module 208 continues receiving the remaining portion of the first packet and other packets from the other communication device 103. However, the computing device 200 merely receives data from the other communication device 103, without sending data to the other communication device 103 at the same time using the wireless channel.

The full-duplex determination module 210 can be software including routines for determining whether a communication device 103 has full-duplex communication capability. In some implementations, the full-duplex determination module 210 can be a set of instructions executable by the processor 225 to provide the functionality described below for determining whether a communication device 103 has full-duplex communication capability. In some implementations, the full-duplex determination module 210 can be stored in the memory 227 of the computing device 200 and can be accessible and executable by the processor 225. The full-duplex determination module 210 may be adapted for cooperation and communication with the processor 225 and other components of the computing device 200 via a signal line 228.

In some implementations, the full-duplex determination module 210 determines whether the computing device 200 has full-duplex communication capability. For example, the full-duplex determination module 210 determines whether the computing device 200 is equipped with components or parts used to implement full-duplex communication between the computing device 200 and another communication device 103. In a further example, the full-duplex determination module 210 determines whether the computing device 200 includes software and hardware (e.g., a transceiver, signal processing modules or circuits) capable of implementing full-duplex communication. If the computing device 200 has full-duplex communication capability, the full-duplex determination module 210 creates a device registry entry for the computing device 200. The device registry entry may include a device ID identifying the computing device 200 and data indicating that the computing device 200 has full-duplex operation capability. In some implementations, the full-duplex determination module 210 may send the device registry entry to the server 107 for storing the device registry entry in the device registry database 109.

In some implementations, another communication device 103 may initiate data transmission to the computing device 200. For example, the other communication device 103 begins transmitting first data to the computing device 200, where the first data includes one or more packets. The full-duplex determination module 210 on the computing device 200 may receive a destination-confirmation signal from the packet processing module 208, where the destination-confirmation signal indicates that the computing device 200 is the single destination of the first data. Responsive to receiving the destination-confirmation signal, the full-duplex determination module 210 may determine whether the other communication device 103 has full-duplex communication capability. For example, the full-duplex determination module 210 determines whether the other communication device 103 has full-duplex communication capability based on a header portion of a first packet received from the other communication device 103, where the header portion includes a capability indication field indicating whether the other communication device 103 has full-duplex communication capability.

In some implementations, the other communication device 103 and the computing device 200 may operate in a regulated spectrum where full-duplex communication capability is required. The full-duplex determination module 210 may determine that the other communication device 103 and the computing device 200 have full-duplex communication capability based on the associated operation spectrum. In some other implementations, the full-duplex determination module 210 receives a device registry entry associated with the other communication device 103 from the memory 227, the storage device 241, or the device registry database 109. The full-duplex determination module 210 determines whether the other communication device 103 has full-duplex communication capability based on the device registry entry.

The full-duplex determination module 210 may determine whether one or more full-duplex activation conditions are satisfied. The one or more full-duplex activation conditions include, but are not limited to: (1) the computing device 200 is the single destination of the first data from the other communication device 103; (2) the computing device 200 has full-duplex communication capability; (3) the other communication device 103 has full-duplex communication capability; and (4) the computing device 200 has second data (including one or more packets) to transmit to the other communication device 103. If the one or more full-duplex activation conditions are satisfied, the full-duplex determination module 210 generates an activation signal and sends the activation signal to the full-duplex implementation module 212. The activation signal may activate the computing device 200 to operate in a full-duplex operation mode so that the computing device 200 may continue receiving the remaining portion of the first data from the other communication device 103 while simultaneously transmitting the second data to the other communication device 103 using the common wireless channel.

However, if at least one of the full-duplex activation conditions is not satisfied (e.g., either the computing device 200 or the other communication device 103 does not have full-duplex communication capability, the computing device 200 does not have data to transmit to the other communication device 103, or the computing device 200 is not the single destination of the first data from the other communication device 103), the full-duplex determination module 210 generates a rejection signal and sends the rejection signal to the full-duplex implementation module 212. The rejection signal may indicate that a full-duplex operation mode of the computing device 200 may not be activated. In some implementations, a rejection signal may not be explicitly generated. Instead, a lack of an activation signal may serve as a rejection to activate the full-duplex operation mode of the computing device 200 or a corresponding communication device 103.

In some implementations, a first and a second communication devices 103 that communicate with each other may go through an initial association exchange process for exchanging messages in which the first and second communication devices 103 agree on certain protocol options, e.g., a bit rate to be used and what region the two devices 103 are in for regulator purposes, etc. An example association exchange process includes an association exchange between an access point and a client station under IEEE 802.11. The association exchange process between the first and second communication devices 103 may include share information related to each device's capabilities such as full-duplex operation capability. Once the shared information is exchanged during the association exchange process, the first communication device 103 and the second communication device 103 may store the shared information describing the two devices' full-duplex operation capability, respectively. Different from the device registry information, the shared information may be stored locally on the two devices and may not be stored on a third communication device 103. The information may not be included in each packet communicated between the two devices and may be included in an initial packet when the two devices discover each other and perform the initial association exchange process.

The full-duplex implementation module 212 can be software including routines for implementing full-duplex communication. In some implementations, the full-duplex implementation module 212 can be a set of instructions executable by the processor 225 to provide the functionality described below for implementation of full-duplex communication. In some implementations, the full-duplex implementation module 212 can be stored in the memory 227 of the computing device 200 and can be accessible and executable by the processor 225. The full-duplex implementation module 212 may be adapted for cooperation and communication with the processor 225 and other components of the computing device 200 via a signal line 230.

In some implementations, the computing device 200 gains access to a shared wireless channel and initiates transmission of unicast packets to another communication device 103 using the shared wireless channel. If the full-duplex determination module 210 determines that the computing device 200 has full-duplex communication capability, the full-duplex implementation module 212 activates the full-duplex operation mode of the computing device 200. The activation of the full-duplex operation mode allows the full-duplex implementation module 212 to transmit first packets to the other communication device 103 while simultaneously receiving second packets from the other communication device 103 using the same wireless channel if the other communication device 103 has the second packets to transmit to the computing device 200.

In some examples, the activation of the full-duplex operation mode in the computing device 200 does not depend on whether the other communication device 103 has full-duplex communication capability. The full-duplex implementation module 212 may activate the full-duplex operation mode of the computing device 200 as soon as the computing device 200 begins to transmit packets to the other communication device 103. For example, the computing device 200 may activate its full-duplex operation mode when it begins to transmit packets to the other communication device 103. Upon the activation of its full-duplex operation mode, the computing device 200 is ready to receive any packets from the other communication device 103. For example, the computing device 200 may receive a packet from the other communication device 103 and may determine that the other communication device 103 has full-duplex communication capability based on a capability indication filed included in the packet. However, before receiving the packet from the other communication device 103 and determining that the other communication device 103 has full-duplex communication capability, the computing device 200 already activates its full-duplex operation mode and gets ready to receive any packets from the other communication device 103.

In some other implementations, the other communication device 103 gains access to the shared wireless channel and initiates transmission of first unicast packets to the computing device 200 using the shared wireless channel. Responsive to receiving an activation signal from the full-duplex determination module 210, the full-duplex implementation module 212 activates the full-duplex operation mode of the computing device 200. The full-duplex operation mode allows the full-duplex implementation module 212 to continue receiving the remaining portion of the first unicast packets from the other communication device 103 while simultaneously transmitting second unicast packets to the other communication device 103 using the shared wireless channel. For example, the full-duplex implementation module 212 may receive the remaining portion of the first unicast packets from the other communication device 103 and may transmit the second unicast packets to the other communication device 103 using the same radio frequency channel at the same time.

In these and other implementations, simultaneous transmission of data between the computing device 200 and the other communication device 103 may be achieved without using a central coordinator to coordinate the data transmission.

In some implementations, an activation of a full-duplex operation mode for a communication device 103 may include switching the communication device 103 from a half-duplex operation mode to the full-duplex operation mode. For example, the communication device 103 operating on the half-duplex operation mode may activate its full-duplex mode by switching to the full-duplex operation mode. Alternatively, the communication device 103 with full-duplex communication capability may activate its full-duplex operation mode directly when the communication device 103 is in operation.

An example use of the full-duplex communication mechanism is provided herein with comparison to a half-duplex communication mechanism. Assume that a first communication device 103 has a first packet to transmit to a second communication device 103 and the second communication device 103 has a second packet to transmit to the first communication device 103. Initially, the first communication device 103 gains access to the shared wireless channel. The time for the first communication device 103 to transmit a header portion of the first packet to the second communication device 103 may be represented as "$t_{H1}$." The time for the first communication device 103 to transmit the entire first packet to the second communication device 103 may be represented as "$t_{P1}$." The time for the second communication device 103 to transmit the entire second packet to the first communication device 103 may be represented as "$t_{P2}$."

For simplicity and illustration purpose only, propagation delay, processing delay, and other protocol delays associated with accessing the wireless channel (e.g., IEEE 802.11 inter-frame spacing) are ignored in the example described herein. Responsive to receiving a first portion (e.g., a header portion) of the first packet, the second communication device 103 determines that the first packet is a unicast packet addressed to the second communication device 103. The second communication device 103 operates in the full-duplex operation mode to transmit the second packet to the first communication device 103 while simultaneously receiving a remaining portion of the first packet from the first communication device 103 using the shared wireless channel. Similarly, the first communication device 103 also operates in the full-duplex operation mode to transmit the remaining portion of the first packet to the second communication device 103 while simultaneously receiving the second packet from the second communication device 103 using the shared wireless channel. The simultaneous transmission of data between the first communication device 103 and the second communication device 103 occurs after the second communication device 103 receives the first portion (e.g., the header portion) of the first packet.

As a result, if the full-duplex communication mechanism described herein is implemented, it may take a time duration "$T_{full-duplex}$" ($T_{full-duplex} = T_{H1} + \max\{T_{P1} - T_{H1}, T_{P2}\}$) for the first communication device 103 to transmit the first packet to the second communication device 103 and the second communication device 103 to transmit the second packet to the first communication device 103. However, if half-duplex communication is implemented, it may take a time duration "$T_{half-duplex}$" ($T_{half-duplex} = T_{P1} + T_{P2}$) for the first communication device 103 to transmit the first packet to the second communication device 103 and the second communication device 103 to transmit the second packet to the first communication device 103, with $T_{full-duplex} < T_{half-duplex}$.

For example, the first packet and the second packet are transmitted using the IEEE 802.11 protocol on a 10 MHz channel with 6 Mbps bit rate. A payload portion of each packet has a size of 1,500 bytes. A header portion of the first packet is transmitted using the first 96 microseconds of the transmission time of the first packet. The time to transmit the entire first packet or the entire second packet is 4,154 microseconds. Thus, with half-duplex communication, the time duration $T_{half-duplex}$ is equal to 8,308 microseconds (4,154+4,154=8,308). However, with full-duplex communication, the time duration $T_{full-duplex}$ is equal to 4,250 microseconds (96+max{4,154−96, 4,154}=4,250), with a time saving of about 49% of the time duration $T_{half-duplex}$.

Methods

Figure 3A:
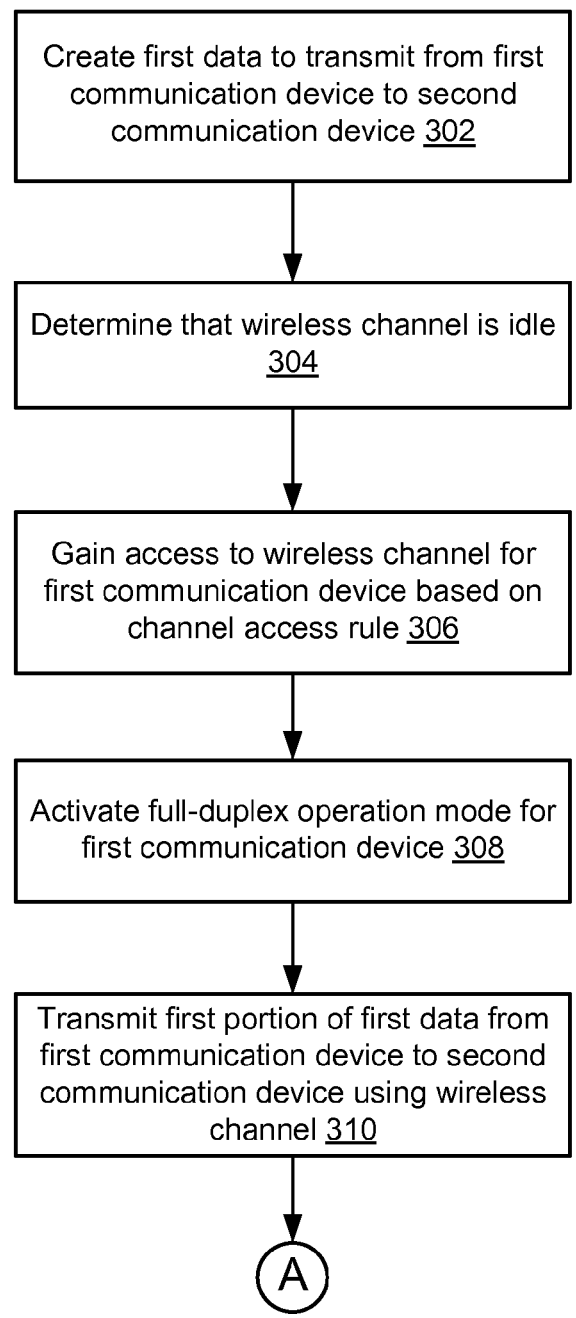
FIGS. 3A and 3B are flowcharts of an example method for implementing full-duplex wireless communications on a side of a first communication device.
Figure 3B:
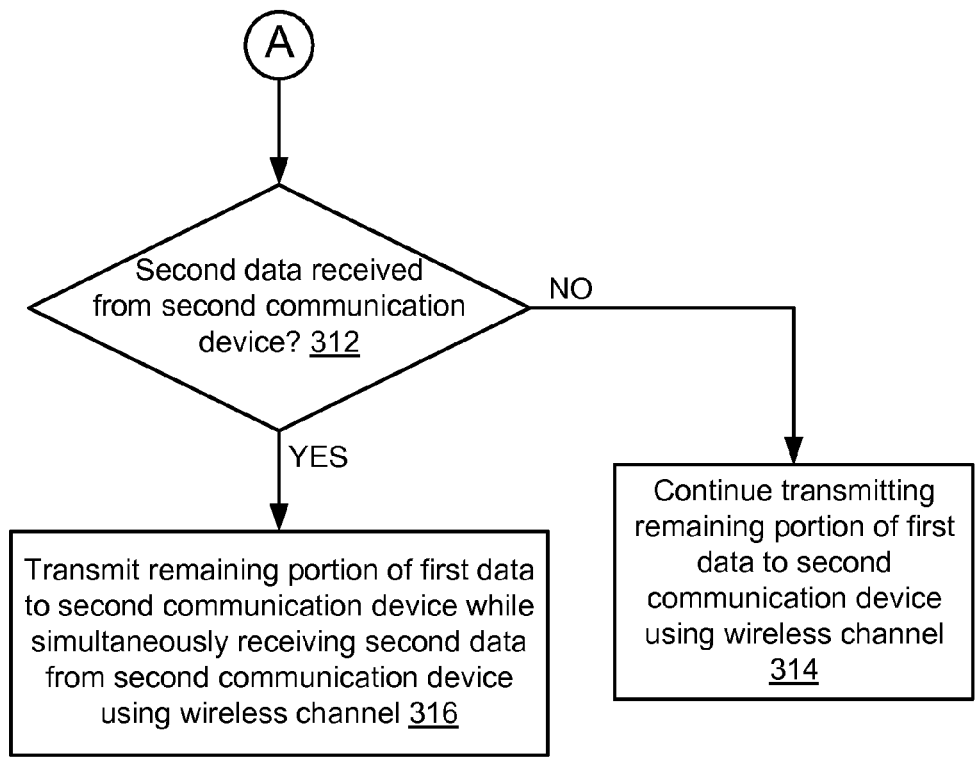

Referring now to FIGS. 3A and 3B, an example of a method 300 for implementing full-duplex wireless communications on a side of a first communication device 103 is described. The first communication device 103 sends and receives data to and from a second communication device 103, where the second communication device 103 shares a common wireless channel with the first communication device 103 and other communication devices 103. The first communication device 103 initiates data transmission to the second communication device 103 using the shared wireless channel.

Referring to FIG. 3A, the packet creation module 204 on the first communication device 103 creates 302 first data to transmit from the first communication device 103 to the second communication device 103. The first data may include one or more unicast packets addressed to the second communication device 103. The channel access module 206 on the first communication device 103 determines 304 that the shared wireless channel is idle. The channel access module 206 gains 306 access to the wireless channel for the first communication device 103 based on a channel access rule.

The full-duplex determination module 210 on the first communication device 103 determines that the first communication device 103 has full-duplex communication capability. The full-duplex implementation module 212 on the first communication device 103 activates 308 a full-duplex operation mode for the first communication device 103. For example, the full-duplex implementation module 212 determines that the second communication device 103 is a single destination of the first data. The full-duplex implementation module 212 activates the full-duplex operation mode of the first communication device 103 responsive to the second communication device 103 being the single destination of the first data. In some examples, the full-duplex implementation module 212 activates the full-duplex operation mode of the first communication device 103 when the first communication device 103 begins to transmit data to the second communication device 103. Alternatively, the full-duplex implementation module 212 may activate the full-duplex operation mode of the first communication device 103 before the first communication device 103 transmits data to the second communication device 103. The full-duplex implementation module 212 transmits 310 a first portion of the first data from the first communication device 103 to the second communication device 103 using the wireless channel. In some examples, the first portion of the first data may include a header portion of a first packet from the first data.

Referring to FIG. 3B, the full-duplex implementation module 212 determines 312 whether second data is received from the second communication device 103. If the second data is received (e.g., the second communication device 103 transmitting data to the first communication device 103), the full-duplex implementation module 212 transmits 316 a remaining portion of the first data to the second communication device 103 while simultaneously receiving the second data from the second communication device 103 using the same wireless channel. In some examples, the remaining portion of the first data may include a payload portion and a trailer portion of the first packet and other packets in the first data. If no data is received from the second communication device 103 (e.g., the second communication device 103 having no data to transmit to the first communication device 103), the full-duplex implementation module 212 continues 314 transmitting the remaining portion of the first data to the second communication device 103 using the wireless channel. In some implementations, operation 312 may be performed implicitly or omitted from the method 300. For example, the first communication device 103 continues to transmit the remaining portion of the first data to the second communication device 103 regardless of receiving the second data from the second communication device 103. While transmitting the first data to the second communication device 103, the first communication device 103 with full-duplex communication capability may receive any data from the second communication device 103 or other communication devices 103 if there is any data to receive within the reception range of the first communication device 103.

In some implementations, the first communication device 103 may operate in a full-duplex operation mode so that the first communication device 103 may receive a first packet from a third communication device 103 while simultaneously transmitting a second packet to the second communication device 103. For example, the first communication device 103 may be in a reception range of the second and third communication devices 103 while the second communication device 103 is not in the reception range of the third communication device 103. The second and third communication devices 103 are not close and do not detect each other. The third communication device 103 may begin a data transmission to the first communication device 103. While receiving a first packet from the third communication device 103, the first communication device 103 may activate its full-duplex operation mode so that the first communication device 103 can also transmit a second packet to the second communication device 103 simultaneously. The first communication device 103 may use a capability indication field in a header section of the second packet to indicate that the first communication device 103 does not operate in a full-duplex operation mode for the second communication device 103 for at least this current data transmission. For example, the capability indication field may indicate that the first communication device 103 operates in a half-duplex operation mode for the second communication device 103. As a result, the second communication device 103 may not transmit data to the first communication device 103 while receiving the second packet from the first communication device 103.

Figure 4:
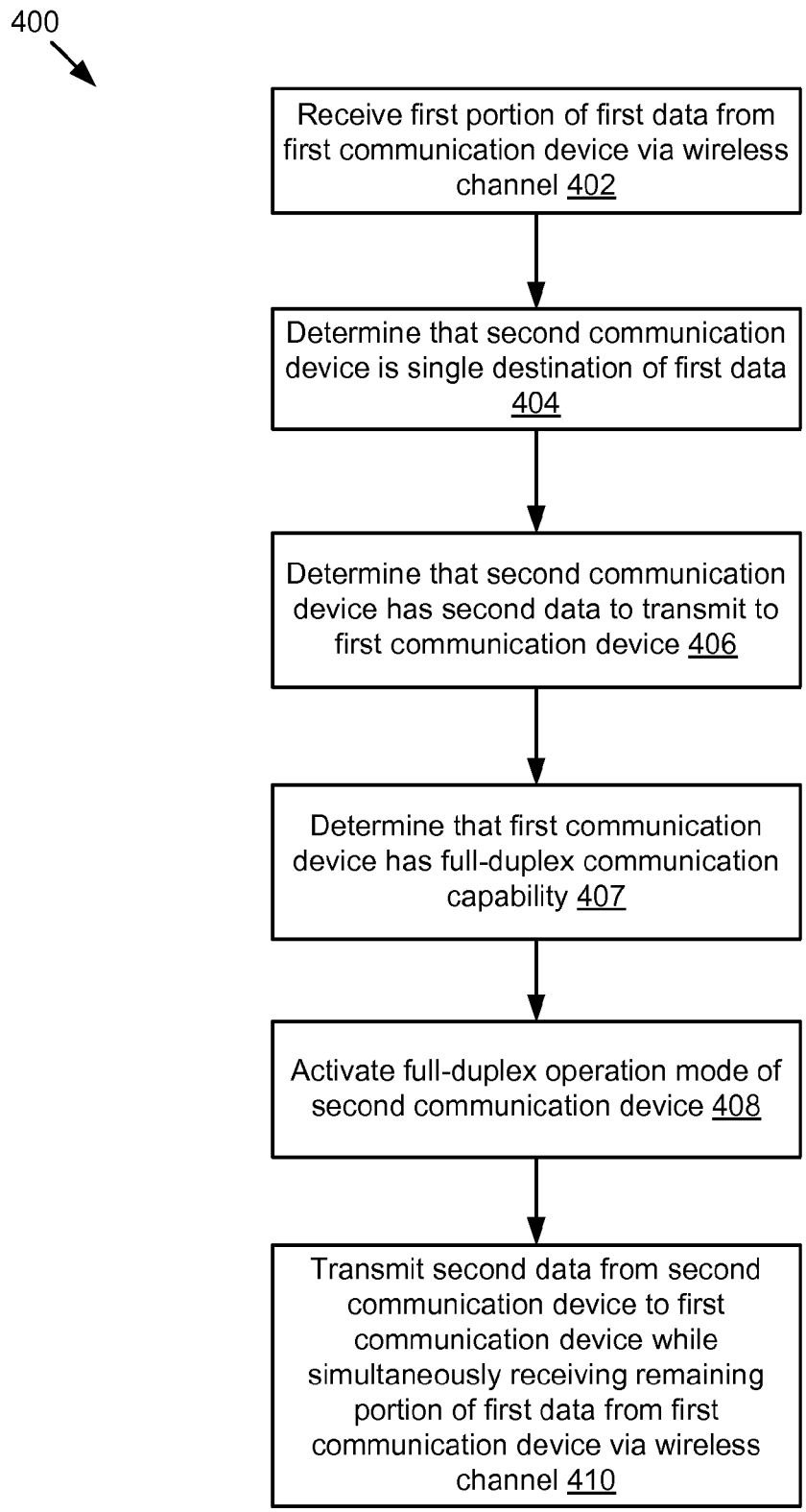
FIG. 4 is a flowchart of an example method for implementing full-duplex wireless communications on a side of a second communication device.

FIG. 4 is a flowchart of an example method 400 for implementing full-duplex wireless communications on a side of a second communication device 103. The first communication device 103 initiates data transmission to the second communication device 103 using a shared wireless channel. The communication module 202 on the second communication device 103 receives 402 a first portion of first data from the first communication device 103 via the wireless channel. In some examples, the first portion of the first data may include a header portion of a first packet from the first data. The packet processing module 208 on the second communication device 103 processes the first portion of the first data to determine 404 that the second communication device 103 is the single destination of the first data.

The full-duplex determination module 210 on the second communication device 103 determines 406 that the second communication device 103 has second data to transmit to the first communication device 103. The full-duplex determination module 210 determines 407 that the first communication device 103 has full-duplex communication capability. The full-duplex determination module 210 also determines that the second communication device 103 has full-duplex communication capability. The full-duplex implementation module 212 activates 408 a full-duplex operation mode of the second communication device 103. The full-duplex implementation module 212 transmits 410 the second data from the second communication device 103 to the first communication device 103 while simultaneously receiving a remaining portion of the first data from the first communication device 103 via the same wireless channel.

In some implementations, one or more of the steps described above for the methods 300, 400 may be performed by a processor-based computing device programmed to perform these steps.

Graphic Representations

FIG. 5 is a graphic representation 500 illustrating an example packet. The example packet includes a header portion, a payload portion 508, and a trailer portion 510. The header portion includes a destination address 502, a source address 504, and other header information 506. The example packet starts from the header portion and ends at the trailer portion 510.

Figure 6A:
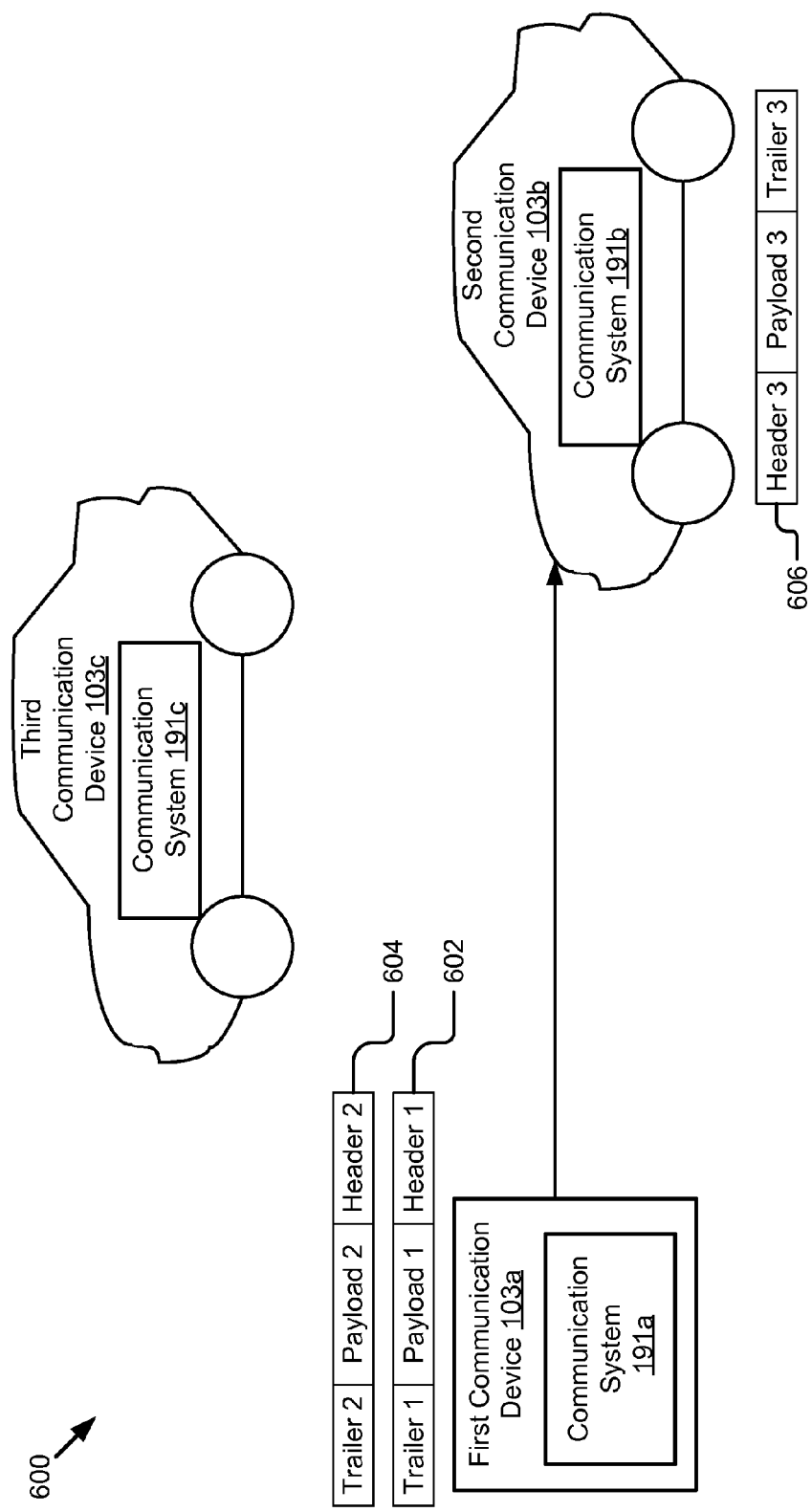
FIGS. 6A-6C are graphic representations illustrating an example process of implementing full-duplex wireless communications between communication devices.
Figure 6B:
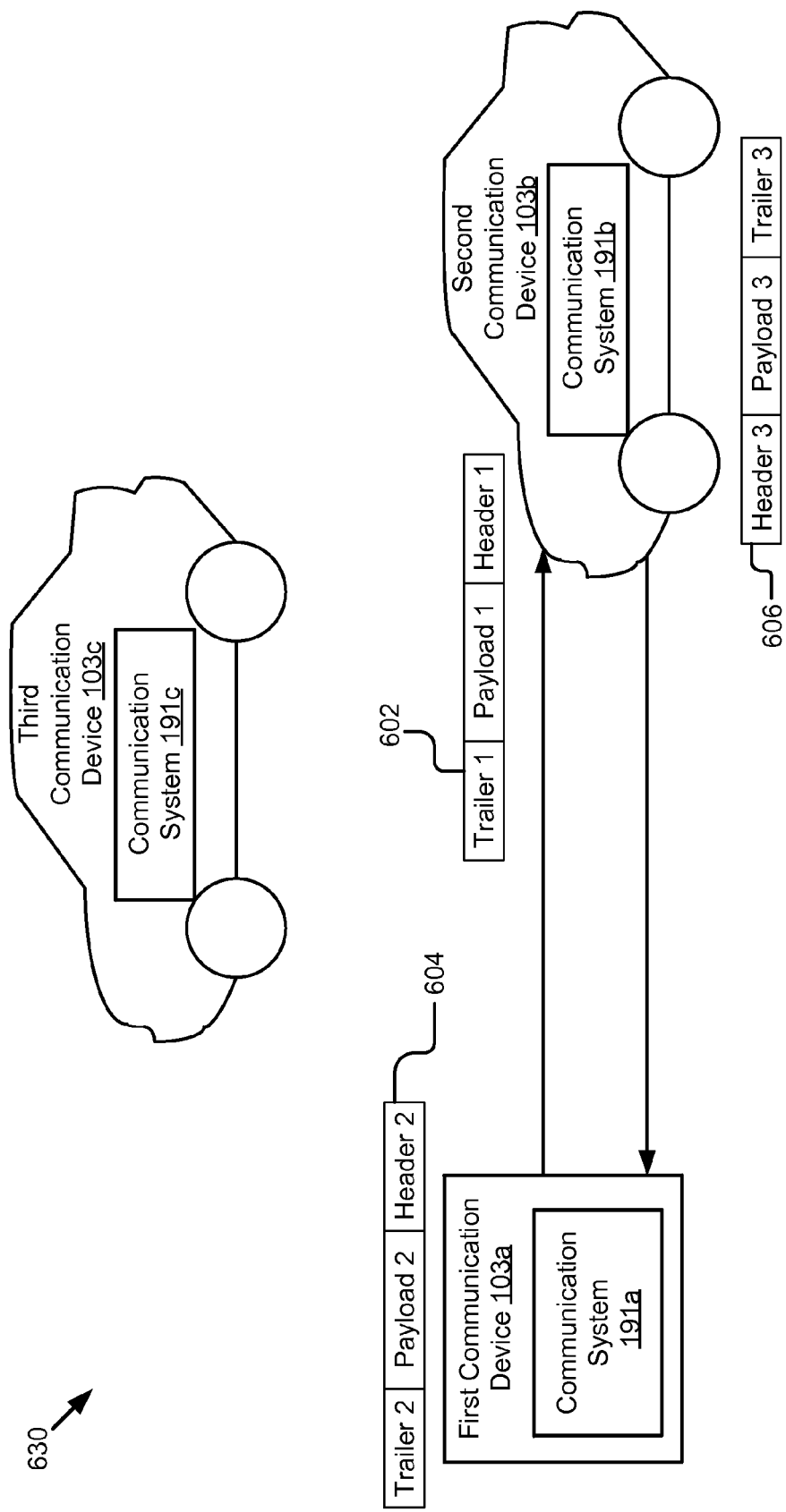
Figure 6C:
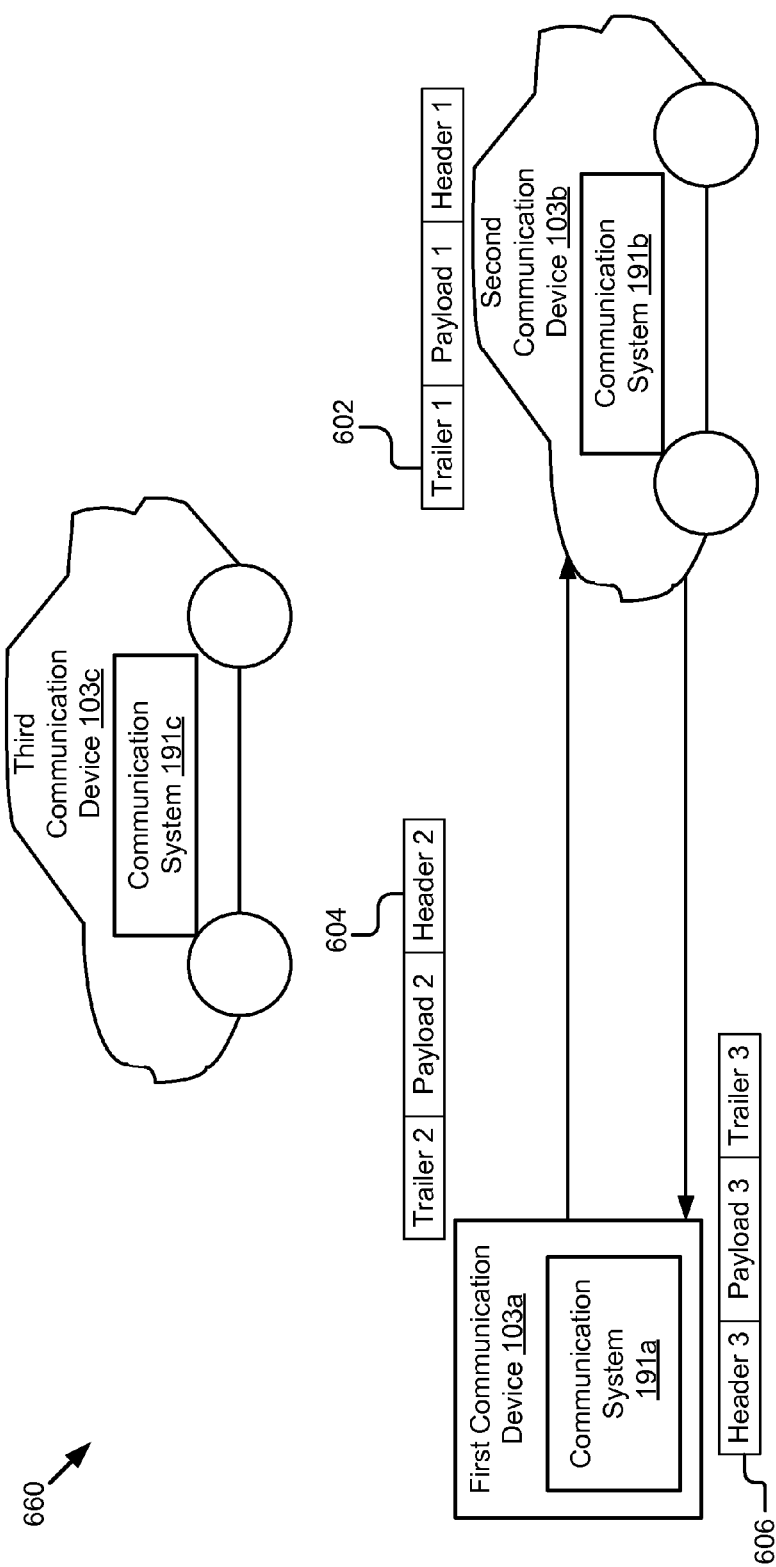

FIGS. 6A-6C are graphic representations 600, 630, and 660 illustrating an example process of implementing full-duplex wireless communication between communication devices 103. The example process achieves full-duplex communication without using a central coordinator that centrally determines which two communication devices 103 communicate over the wireless channel at a given time.

Referring to FIG. 6A, the first communication device 103a, the second communication device 103b, and the third communication device 103c share a common wireless channel. The first communication device 103a has two packets 602 and 604 to transmit to the second communication device 103b. The second communication device 103b has a packet 606 to transmit to the first communication device 103a. When the wireless channel is idle, the communication devices 103a, 103b, and 103c may compete for access to the wireless channel based on channel access rules such as IEEE 802.11 CSMA/CA. Assume that the first communication device 103a gains access to the wireless channel. The first communication device 103a starts to transmit the first packet 602 to the second communication device 103b. The second communication device 103b and the third communication device 103c listen to the wireless channel and determine that the wireless channel is busy. Thus, the second communication device 103b and the third communication device 103c withhold data transmission during an initial phase of the transmission of the first communication device 103a.

The first communication device 103a activates its full-duplex operation mode after initiating the packet transmission so that the first communication device 103a is ready to receive data from the second communication device 103b while simultaneously transmitting data to the second communication device 103b.

Referring to FIG. 6B, the second communication device 103b receives a first portion of the first packet 602 from the first communication device 103a. For example, the second communication device 103b receives a header portion of the first packet. The second communication device 103b determines that the first packet 602 is a unicast packet addressed to the second communication device 103b and that the first communication device 103a is the sender. Since the second communication device 103b has the packet 606 to send to the first communication device 103a and both the first communication device 103a and the second communication device 103b are capable of full-duplex communication, the second communication device 103b may transmit the packet 606 to the first communication device 103a while simultaneously receiving a remaining portion of the first packet 602 as well as the packet 606. Correspondingly, the first communication device 103a may receive the packet 606 from the second communication device 103b while simultaneously continuing transmitting the remaining portion of the first packet 602 as well as the packet 604 using the same wireless channel.

The third communication device 103c remains silent. The third communication device 103c may decode the first portion of the first packet 602 and may determine that the first packet 602 is not addressed to the third communication device 103c. In some implementations, the third communication device 103c may not be capable of decoding the first portion of the first packet 602 because a signal strength of the first portion of the first packet 602 is weak when arriving at the third communication device 103c. The third communication device 103c may continue monitoring the wireless channel. In some implementations, the third communication device 103c may continue monitoring the wireless channel whether or not it has data to transmit.

Referring to FIG. 6C, the first communication device 103a may continue transmitting the packet 604 to the second communication device 103b after the transmission of the first packet 602. Simultaneously, the first communication device 103a may receive the remaining portion of the packet 606 from the second communication device 103b using the same wireless channel. Correspondingly, the second communication device 103b may receive the packet 604 from the first communication device 103a while simultaneously transmitting the packet 606 to the first communication device 103a using the wireless channel. The third communication device 103c remains silent. The third communication device 103c may continue monitoring the wireless channel. In some implementations, the third communication device 103c may continue monitoring the wireless channel whether or not it has data to transmit.

In the above description, for purposes of explanation, numerous specific details are set forth in order to provide a thorough understanding of this disclosure. It will be apparent, however, to one skilled in the art that the disclosure can be practiced without these specific details. In some instances, structures and devices are shown in block diagram form in order to avoid obscuring the description. For example, the present implementations can be described above primarily with reference to user interfaces and particular hardware. However, the present implementations can apply to any type of computing device that can receive data and commands, and any peripheral devices providing services.

Reference in this disclosure to "some implementations" or "some instances" means that a particular feature, structure, or characteristic described in connection with the implementations or instances can be included in at least one implementation of the description. The appearances of the phrase "in some implementations" in various places in this disclosure are not necessarily all referring to the same implementations.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present implementations of this disclosure can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

This disclosure can take the form of some entirely hardware implementations, some entirely software implementations or some implementations containing both hardware and software elements. In some preferred implementations, this disclosure is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device. The computer-readable medium may be a tangible or non-transitory computer-readable storage medium. The computer-readable medium may store computer executable code. The computer-readable medium may be communicatively coupled to a processor. The processor may be programmed to execute one or more portions of the computer-executable code.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, this disclosure is not described with reference to any particular programming language. It will be appreciated that a variety of programming languages may be used to implement the teachings of this disclosure as described herein.

The foregoing description of the implementations of this disclosure has been presented for the purposes of illustration and description. It is not intended to be exhaustive or to limit this disclosure to the precise form disclosed. Many modifications and variations are possible in light of the above teaching. It is intended that the scope of the disclosure be limited not by this detailed description, but rather by the claims of this application. As will be understood by those familiar with the art, this disclosure may be embodied in other specific forms without departing from the spirit or essential characteristics thereof. Likewise, the particular naming and division of the modules, routines, features, attributes, methodologies, and other aspects are not mandatory or significant, and the mechanisms that implement this disclosure or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of this disclosure is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of this disclosure, which is set forth in the following claims.

What is claimed is:

1. A computer-implemented method comprising:
   creating, at a first communication device, first data to transmit to a second communication device;
   switching, by a processor-based computing device programmed to perform the switching, a half-duplex operation mode of the first communication device to a full-duplex operation mode to activate the full-duplex operation mode of the first communication device;

transmitting a first portion of the first data from the first communication device to the second communication device using a wireless channel; and transmitting, in the full-duplex operation mode of the first communication device, a remaining portion of the first data to the second communication device while simultaneously receiving second data from the second communication device using the wireless channel.

2. The method of claim 1, further comprising:
determining that the wireless channel is idle; and
accessing the wireless channel for data communication between the first communication device and the second communication device based on a channel access rule.

3. The method of claim 1, wherein the first data includes a first packet and the first portion of the first data includes a header portion of the first packet.

4. The method of claim 3, wherein the remaining portion of the first data includes a payload portion and a trailer portion of the first packet.

5. The method of claim 1, wherein activating the full-duplex operation mode of the first communication device comprises:
determining that the second communication device is a single destination of the first data; and
activating the full-duplex operation mode of the first communication device responsive to the second communication device being the single destination of the first data.

6. The method of claim 1, wherein the first communication device and the second communication device are communication devices in a wireless local area network.

7. A computer-implemented method comprising:
receiving a first portion of first data from a first communication device via a wireless channel;
determining that a second communication device is a single destination of the first data based on the first portion of the first data;
determining that the second communication device has second data to transmit to the first communication device;
determining that the first communication device has full-duplex communication capability;
switching, by a processor-based computing device programmed to perform the switching, a half-duplex operation mode of the second communication device to a full-duplex operation mode to activate the full-duplex operation mode of the second communication device; and
transmitting, in the full-duplex operation mode of the second communication device, the second data to the first communication device while simultaneously receiving a remaining portion of the first data from the first communication device using the wireless channel.

8. The method of claim 7, wherein:
the first data includes a first packet;
the first portion of the first data includes a header portion of the first packet; and
the remaining portion of the first data includes a payload portion and a trailer portion of the first packet.

9. The method of claim 7, wherein determining that the first communication device has full-duplex communication capability comprises determining that the first communication device operates in a regulated spectrum where full-duplex communication capability is required.

10. The method of claim 7, wherein determining that the first communication device has full-duplex communication capability comprises:

receiving device registry data associated with the first communication device; and
determining that the first communication device has full-duplex communication capability based on the device registry data.

11. The method of claim 7, wherein determining that the first communication device has full-duplex communication capability comprises:
determining that the first communication device has full-duplex communication capability based on a capability indication field in the first portion of the first data, the capability indication field including data describing whether the first communication device has full-duplex communication capability.

12. A computer program product comprising a non-transitory computer-usable medium including a computer-readable program, wherein the computer-readable program when executed on a computer programmed to execute the computer-readable program causes the computer to:
create, at a first communication device, first data to transmit to a second communication device;
switch a half-duplex operation mode of the first communication device to a full-duplex operation mode to activate the full-duplex operation mode of the first communication device;
transmit a first portion of the first data from the first communication device to the second communication device using a wireless channel; and
transmit, in the full-duplex operation mode of the first communication device, a remaining portion of the first data to the second communication device while simultaneously receiving second data from the second communication device using the wireless channel.

13. The computer program product of claim 12, wherein the computer-readable program when executed on the computer causes the computer to also:
determine that the wireless channel is idle; and
access the wireless channel for data communication between the first communication device and the second communication device based on a channel access rule.

14. The computer program product of claim 12, wherein the first data includes a first packet and the first portion of the first data includes a header portion of the first packet.

15. The computer program product of claim 14, wherein the remaining portion of the first data includes a payload portion and a trailer portion of the first packet.

16. The computer program product of claim 12, wherein activating the full-duplex operation mode of the first communication device comprises:
determining that the second communication device is a single destination of the first data; and
activating the full-duplex operation mode of the first communication device responsive to the second communication device being the single destination of the first data.

17. The computer program product of claim 12, wherein the first communication device and the second communication device are communication devices in a wireless local area network.

18. A computer program product comprising a non-transitory computer-usable medium including a computer-readable program, wherein the computer-readable program when executed on a computer programmed to execute the program causes the computer to:
receive a first portion of first data from a first communication device via a wireless channel;

determine that a second communication device is a single destination of the first data based on the first portion of the first data;
determine that the second communication device has second data to transmit to the first communication device;
determine that the first communication device has full-duplex communication capability;
switch a half-duplex operation mode of the second communication device to a full-duplex operation mode to activate the full-duplex operation mode of the second communication device; and
transmit, in the full-duplex operation mode of the second communication device, the second data to the first communication device while simultaneously receiving a remaining portion of the first data from the first communication device using the wireless channel.

19. The computer program product of claim 18, wherein:
the first data includes a first packet;
the first portion of the first data includes a header portion of the first packet; and
the remaining portion of the first data includes a payload portion and a trailer portion of the first packet.

20. The computer program product of claim 18, wherein determining that the first communication device has full-duplex communication capability comprises determining that the first communication device operates in a regulated spectrum where full-duplex communication capability is required.

21. The computer program product of claim 18, wherein determining that the first communication device has full-duplex communication capability comprises:
receiving device registry data associated with the first communication device; and
determining that the first communication device has full-duplex communication capability based on the device registry data.

22. The computer program product of claim 18, wherein determining that the first communication device has full-duplex communication capability comprises:
determining that the first communication device has full-duplex communication capability based on a capability indication field in the first portion of the first data, the capability indication field including data describing whether the first communication device has full-duplex communication capability.

23. A system comprising:
a processor; and
a non-transitory memory storing instructions that, when executed by the processor, cause the system to:
create, at a first communication device, first data to transmit to a second communication device;
switch a half-duplex operation mode of the first communication device to a full-duplex operation mode to activate the full-duplex operation mode of the first communication device;
transmit a first portion of the first data from the first communication device to the second communication device using a wireless channel; and
transmit, in the full-duplex operation mode of the first communication device, a remaining portion of the first data to the second communication device while simultaneously receiving second data from the second communication device using the wireless channel.

24. The system of claim 23, wherein the instructions when executed cause the system to also:
determine that the wireless channel is idle; and
access the wireless channel for data communication between the first communication device and the second communication device based on a channel access rule.

25. The system of claim 23, wherein the first data includes a first packet and the first portion of the first data includes a header portion of the first packet.

26. The system of claim 25, wherein the remaining portion of the first data includes a payload portion and a trailer portion of the first packet.

27. The system of claim 23, wherein the instructions when executed cause the system to activate the full-duplex operation mode of the first communication device by:
determining that the second communication device is a single destination of the first data; and
activating the full-duplex operation mode of the first communication device responsive to the second communication device being the single destination of the first data.

28. The system of claim 23, wherein the first communication device and the second communication device are communication devices in a wireless local area network.

29. A system comprising:
a processor; and
a non-transitory memory storing instructions that, when executed by the processor, cause the system to:
receive a first portion of first data from a first communication device via a wireless channel;
determine that a second communication device is a single destination of the first data based on the first portion of the first data;
determine that the second communication device has second data to transmit to the first communication device;
determine that the first communication device has full-duplex communication capability;
switch a half-duplex operation mode of the second communication device to a full-duplex operation mode to activate the full-duplex operation mode of the second communication device; and
transmit, in the full-duplex operation mode of the second communication device, the second data to the first communication device while simultaneously receiving a remaining portion of the first data from the first communication device using the wireless channel.

30. The system of claim 29, wherein:
the first data includes a first packet;
the first portion of the first data includes a header portion of the first packet; and
the remaining portion of the first data includes a payload portion and a trailer portion of the first packet.

31. The system of claim 29, wherein the instructions when executed cause the system to determine that the first communication device has full-duplex communication capability by determining that the first communication device operates in a regulated spectrum where full-duplex communication capability is required.

32. The system of claim 29, wherein the instructions when executed cause the system to determine that the first communication device has full-duplex communication capability by:
receiving device registry data associated with the first communication device; and
determining that the first communication device has full-duplex communication capability based on the device registry data.

33. The system of claim 29, wherein the instructions when executed cause the system to determine that the first communication device has full-duplex communication capability by determining that the first communication device has full-duplex communication capability based on a capability indication field in the first portion of the first data, the capability indication field including data describing whether the first communication device has full-duplex communication capability.

34. A computer-implemented method comprising:
creating, at a first communication device, first data to transmit to a second communication device;
activating, by a processor of the first communication device, a full-duplex operation mode of the first communication device; and
transmitting a first portion of the first data from the first communication device to the second communication device using a wireless channel while simultaneously receiving second data from the second communication device using the wireless channel.

35. The method of claim 34, wherein the second communication device also operates in the full-duplex operation mode.

36. The method of claim 35, wherein the second communication device receives the first data from the first communication device while simultaneously transmitting the second data to the first communication device.

37. A computer-implemented method comprising:
receiving, from a first communication device, first data at a second communication device via a wireless channel;
activating, by a processor of the second communication device, a full-duplex operation mode of the second communication device responsive to receiving at least a portion of the first data;
determining, while simultaneously receiving the first data, second data to transmit from the second communication device to the first communication device responsive to receiving at least a portion of the first data; and
transmitting, while simultaneously receiving the first data, the second data to the first communication device using the wireless channel, the second data transmitted from the second communication device to the first communication device via the wireless channel while the second communication device is operating in the full-duplex mode.

38. The method of claim 37, wherein the first communication device also operates in the full-duplex operation mode.

39. A computer-implemented method comprising:
determining, at a first communication device, first data to transmit to a second communication device;
switching, by a processor-based computing device programmed to perform the switching, the first communication device from a half-duplex operation mode to a full-duplex operation mode;
transmitting, in the full-duplex operation mode of the first communication device, the first data to the second communication device while simultaneously receiving second data from the second communication device using the wireless channel; and
switching the full-duplex operation mode of the first communication device to the half-duplex operation mode responsive to a determination that transmission of the first data completes.

40. A computer-implemented method comprising:
receiving, from a first communication device, first data at a second communication device via a wireless channel;
determining that the second communication device has second data to transmit to the first communication device;
switching, by a processor-based computing device programmed to perform the switching, the second communication device from a half-duplex operation mode to a full-duplex operation mode;
transmitting, in the full-duplex operation mode of the second communication device, the second data to the first communication device while simultaneously receiving the first data from the first communication device using the wireless channel; and
switching the full-duplex operation mode of the second communication device to the half-duplex operation mode responsive to a determination that transmission of the second data completes.

* * * * *